UNITED STATES PATENT OFFICE.

HANS GOLDSCHMIDT AND OTTO WEIL, OF ESSEN-ON-THE-RUHR, GERMANY.

METHOD OF MANUFACTURING METALS AND COMPOSITIONS USED THEREIN.

No. 860,799.

Specification of Letters Patent.

Patented July 23, 1907.

Application filed May 2, 1906. Serial No. 314,890.

*To all whom it may concern:*

Be it known that we, HANS GOLDSCHMIDT and OTTO WEIL, both subjects of the King of Prussia, German Emperor, and residents of Essen-on-the-Ruhr, in the German Empire, have jointly invented a new and Improved Method of Manufacturing Metals and the Composition Used Therein, of which the following is an exact specification.

Our invention relates to and has for its object a new and improved method of manufacturing metals according to the well-known alumino-thermic or so-called "Goldschmidt" process.

The object of our invention is to make the above mentioned Goldschmidt process more economical by increasing the output of the metal. This is obtained by altering the mixture hitherto used in the Goldschmidt process.

According to the well known Goldschmidt process a manganese compound $Mn_3O_4$ is employed which represents the lowest degree of oxidation for practical purposes. The result of its use is but a small output of metal, which is due to the slow proceeding of the reaction taking place, so that but very little metal can separate from the slag. If however a manganese compound of a higher degree of oxidation is used, the reaction takes place too quickly, whereby danger and loss of metal arise.

The feature of our invention consists in using a manganese compound, containing such an amount of oxygen that it corresponds to the formula $Mn_3O_4$ with a small percentage of a manganese compound of a higher degree of oxidation.

A most important novelty in our new process is the fact that only a comparatively small quantity of a manganese compound of a higher degree of oxidation is necessary for the better output of the process.

For the manufacture of manganese the following facts are to be regarded: We have manganese compounds of different degrees of oxidation and as known the lowest for practical use is $Mn_3O_4$; it contains about 7 per cent of active oxygen. This compound however does not produce a satisfactory result, when mixed with aluminium, under approximate theoretic proportions, and when this mixture is afterwards ignited. But a good reguline separation of manganese takes place by the addition of a relatively small quantity of a manganese compound of a higher degree of oxidation such as $Mn_2O_3$, containing 10 per cent of oxygen, or $MnO_2$ having 18 per cent of active oxygen; the compound: Manganic acid $Mn_2O_7$ or a salt of this acid may be used and works in a similar manner.

We now have found by numerous trials that always a highly satisfactory separation of the manganese takes place by using a mixture of manganese compound containing about 8 per cent of active oxygen, that is to say only one per cent more than the active quantity of oxygen contained in the $Mn_3O_4$. Of course we can obtain such a degree of oxidation by mixing different oxids of manganese and we will give afterwards an example; but we can also obtain this degree of oxidation by the well known chemical processes in treating manganese ores for the purpose of reducing or oxidizing (heating or burning) the ores.

Now may follow the example: A suitable mixture for the manufacture of manganese is the following: 73 kilograms of $Mn_3O_4$ and 5 kilograms $MnO_2$ both in the form of a powder and 22 kilograms finely granulated or powdered aluminium are mixed and then ignited. When the process of reduction takes place, we may add new masses of the mixture as already known in the Goldschmidt process. We obtain a good reguline body of manganese and the output is about 90 per cent and more. This great output is a great advantage which up to now could never be obtained. Of course fluxes as lime, fluor spar, sodium oxid, can be added to the afore mentioned mixture.

Having thus fully described the nature of our invention, what we desire to secure by Letters Patent of the United States is:—

1. Improvements in manufacturing manganese according to the alumino-thermic process, consisting in adding to aluminium a manganese compound having more active oxygen than contained in the formula $Mn_3O_4$ and igniting the mixture.

2. Improvements in manufacturing manganese according to the alumino-thermic process, consisting in adding to aluminium a manganese compound having about 8 per cent of active oxygen and igniting the mixture.

3. Improvements in manufacturing manganese according to the alumino-thermic process, consisting in adding to aluminium a manganese compound $Mn_3O_4$ with a quantity of a manganese compound of a higher degree of oxidation and igniting the mixture.

4. Improvements in manufacturing manganese according to the alumino-thermic process, consisting in adding to 22 per cent. aluminium in weight 5 per cent. of $MnO_2$ in weight and 73 per cent. of $Mn_3O_4$ in weight and igniting the mixture.

5. As an article of manufacture, a mixture of aluminium with a manganese compound containing more active oxygen than contained in the formula $Mn_3O_4$.

6. As an article of manufacture, a mixture of aluminium with a manganese compound having about 8 per cent of active oxygen.

7. As an article of manufacture, a mixture of aluminium with a manganese compound $Mn_3O_4$ and a quantity of a manganese compound of a higher degree of oxidation.

8. As an article of manufacture, a mixture consisting of 22 per cent aluminium in weight, 5 per cent $MnO_2$ in weight and 73 per cent $Mn_3O_4$ in weight.

9. As an article of manufacture a mixture of aluminium with a manganese compound and another oxid, so that the whole mixture contains more active oxygen than contained in the formula $Mn_3O_4$.

In witness whereof we have hereunto set our hand in the presence of two witnesses.

HANS GOLDSCHMIDT.
OTTO WEIL.

Witnesses for Hans Goldschmidt:
HENRY HASPER,
WOLDEMAR HAUPT.

Witnesses for Otto Weil:
PETER LIEBER,
ALFR. POHLMEYER.